United States Patent
Little

(10) Patent No.: US 9,923,316 B1
(45) Date of Patent: Mar. 20, 2018

(54) MODEL RAILROAD ACCESSORY INTERFACE

(71) Applicant: Jarrod Little, Munson, PA (US)

(72) Inventor: Jarrod Little, Munson, PA (US)

(*) Notice: Subject to any disclaimer, the term of this patent is extended or adjusted under 35 U.S.C. 154(b) by 213 days.

(21) Appl. No.: 14/685,194

(22) Filed: Apr. 13, 2015

Related U.S. Application Data

(60) Provisional application No. 61/978,928, filed on Apr. 13, 2014.

(51) Int. Cl.
| | |
|---|---|
| H01R 31/06 | (2006.01) |
| H01R 24/58 | (2011.01) |
| H01R 24/20 | (2011.01) |
| H01R 24/76 | (2011.01) |
| H01R 43/20 | (2006.01) |

(52) U.S. Cl.
CPC ............ *H01R 24/58* (2013.01); *H01R 24/20* (2013.01); *H01R 24/76* (2013.01); *H01R 43/20* (2013.01)

(58) Field of Classification Search
CPC ........ H01R 24/58; H01R 24/70; H01R 24/76; H01R 31/06
See application file for complete search history.

(56) References Cited

U.S. PATENT DOCUMENTS

| | | | | |
|---|---|---|---|---|
| 4,362,905 | A * | 12/1982 | Ismail | H01R 27/02 439/638 |
| 4,767,338 | A * | 8/1988 | Dennis | H01R 31/06 439/76.1 |
| 5,297,484 | A * | 3/1994 | Piserchia | A63H 19/00 104/DIG. 1 |
| 5,666,408 | A * | 9/1997 | Lao | H01R 27/02 439/676 |
| 6,322,375 | B1 * | 11/2001 | Cole | H01R 13/6658 439/409 |
| 7,164,368 | B1 * | 1/2007 | Ireland | G01D 7/12 246/167 R |
| 7,177,733 | B2 * | 2/2007 | Katzer | A63H 19/24 701/19 |

(Continued)

OTHER PUBLICATIONS

MTH Operating Accessories! | O Gauge Railroading On Line Forum, http://ogrforum.ogaugerr.com/topic/mth-operating-accessories, obtained Apr. 6, 2015, 9 pages.

(Continued)

*Primary Examiner* — Briggitte R Hammond
(74) *Attorney, Agent, or Firm* — Fish & Richardson P.C.

(57) ABSTRACT

A device and system and method for connecting powered accessories to a model railroad layout using an electronic interface device (EID). The EID includes a terminal for interfacing with an accessory control device that is configured to control features of model railroad accessories, and a connection jack configured to accept an accessory cable plug that is connected to two or more wires of an accessory cable. The connection jack places at least one of the two or more wires of the accessory cable in electrical contact with the terminal of the EID such that, when the accessory control device is electrically connected to the terminal, the at least one of the two or more wires of the accessory cable are placed in electrical communication with the accessory control device, when the plug of the accessory cable is plugged into the connection jack.

10 Claims, 5 Drawing Sheets

(56) References Cited

U.S. PATENT DOCUMENTS

| | | | | |
|---|---|---|---|---|
| 8,099,610 | B2* | 1/2012 | Cousy | G06F 1/266 439/638 |
| 8,979,574 | B2* | 3/2015 | Daily, Jr. | H01R 4/2433 439/467 |
| 2002/0146207 | A1* | 10/2002 | Chu | G02B 6/4277 385/134 |
| 2005/0282432 | A1* | 12/2005 | Murr | H01R 13/6658 439/540.1 |
| 2006/0046575 | A1* | 3/2006 | Allen | H01R 33/97 439/638 |
| 2007/0293094 | A1* | 12/2007 | Aekins | H01R 13/7195 439/676 |
| 2012/0100744 | A1* | 4/2012 | Bolouri-Saransar | H01R 13/6469 439/676 |
| 2012/0221181 | A1* | 8/2012 | Rosener | A63H 19/24 701/20 |
| 2013/0149912 | A1* | 6/2013 | Oberski | H01R 24/64 439/676 |
| 2016/0006300 | A1* | 1/2016 | Grujovski | H02J 13/0093 307/64 |

OTHER PUBLICATIONS

Lionel Plug N Play | O Gauge Railroading on Line Forum, http://ogrforum.ogaugerr.com/topic/lionel-plug-n-play?reply=35358639514555191#35358639514555191, obtained Apr. 6, 2015, 5 pages.

Just PlugTM Lighting System—Woodland Scenics—Model Layouts, Scenery, Buildings and Figures, http://woodlandscenics.woodlandscenics.com/show/category/JustPlugLightingSystem, obtained Apr. 15, 2015, 4 pages.

Atlas Model Railroad Company, Inc. Online Store—075, http://shop.atlasrr.com/c-222-075.aspx, obtained Apr. 15, 2015, 2 pages.

\* cited by examiner

FIG. 2A
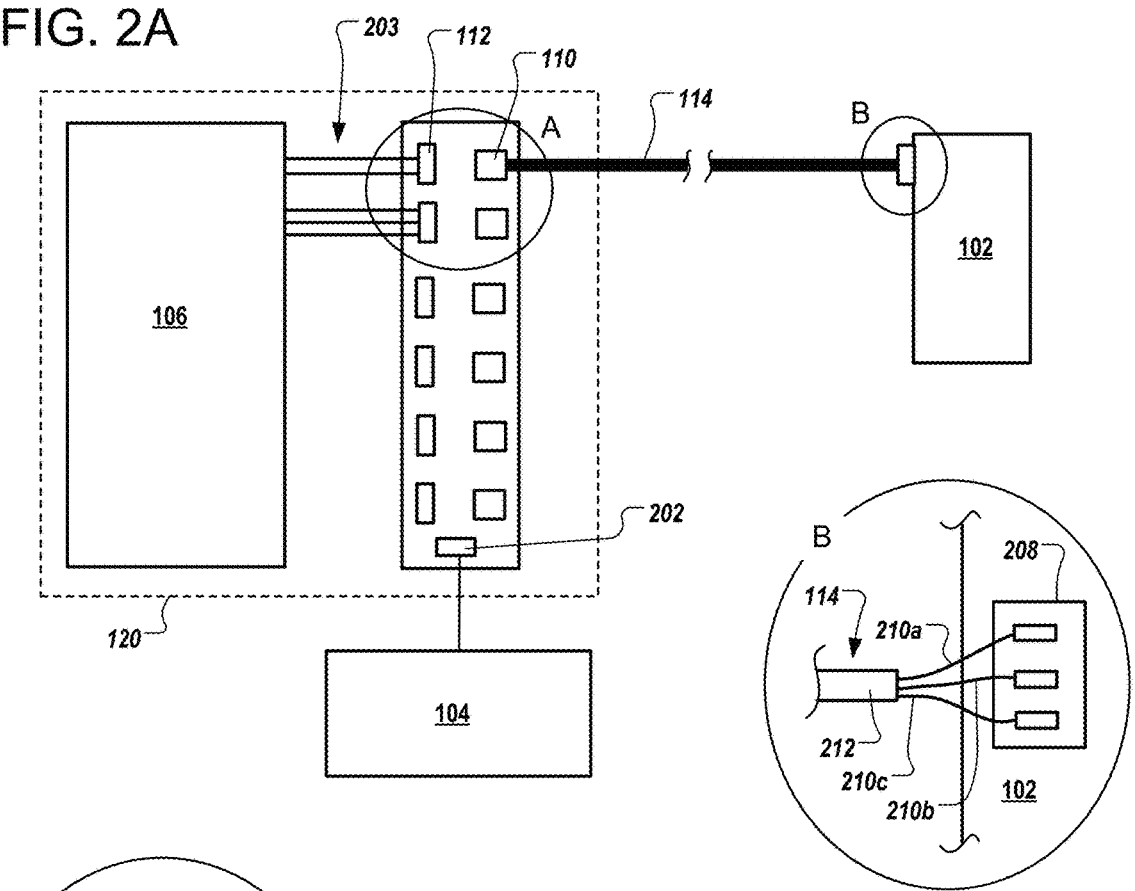
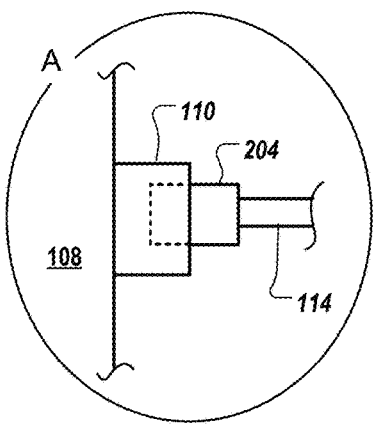
FIG. 2B
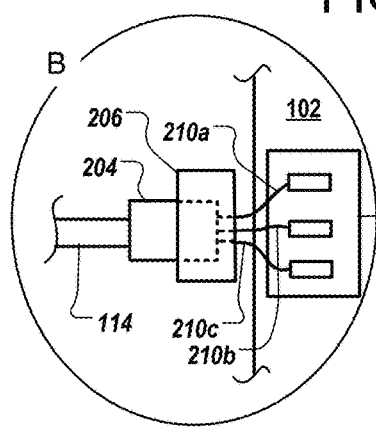
FIG. 2C
FIG. 2D

PINS 2, 4, 6, 8    PINS 1, 3, 5, 7

MODEL RAILROAD ACCESSORY INTERFACE

CROSS REFERENCE TO RELATED APPLICATIONS

This application claims the benefit of the filing date of U.S. Provisional Application No. 61/978,928, which was filed on Apr. 13, 2014. The contents of U.S. Application No. 61/978,928 are incorporated by reference in their entirety as part of this application.

FIELD

This document relates to model railroad accessories and accessory control systems.

BACKGROUND

Wiring accessories to a model railroad can be confusing and time consuming. In certain circumstances, one may wish to add multiple accessories to a model railroad and each accessory may require wiring for lighting and operation of the accessories. In some cases, adding accessories may require wiring multiple accessories to an accessory control device. In any event, wiring for accessories can become cumbersome and overwhelming as multiple accessories are added to a model railroad.

SUMMARY

One aspect features an electronic interface device (EID) for controlling model railroad accessories. The EID includes a terminal for interfacing with an accessory control device that is configured to control features of model railroad accessories, and a connection jack configured to accept an accessory cable plug that is connected to two or more wires of an accessory cable. The connection jack places at least one of the two or more wires of the accessory cable in electrical contact with the terminal of the EID such that, when the accessory control device is electrically connected to the terminal, the at least one of the two or more wires of the accessory cable are placed in electrical communication with the accessory control device, when the plug of the accessory cable is plugged into the connection jack.

Implementations can include one or more of the following features. For example, the EID can include a power supply terminal electrically connected to the connection jack such that electrical power can be provided through the power supply terminal to at least one of the two or more wires of the accessory cable, when the plug of the accessory cable is plugged into connection jack. The terminal and the connection jack can form a terminal/connection jack pair, and where the electronic interface device further comprises a plurality of terminal/connection jack pairs. The connection jack can be a plug and socket type of electrical connection. The connection jack can be an RJ45 jack.

Another aspect features a system for connecting powered accessories to a model railroad layout. The system includes an accessory cable including two or more individually insulated wires surrounded by a jacket to form a single assembly and a plug connected to the two or more wires, and an EID. The EID includes a terminal for interfacing with an accessory control device that is configured to control features of model railroad accessories, and a connection jack configured to accept the plug of the accessory cable. The jack places at least one of the two or more wires of the accessory cable in electrical contact with the terminal such that, when the accessory control device is electrically connected to the terminal, the at least one of the two or more wires of the accessory cable are placed in electrical communication with the accessory control device, when the plug of the accessory cable is plugged into the connection jack.

Implementations can include one or more of the following features. For example, the plug can be a first plug, and the accessory cable can include a second plug connected to the two or more wires at an end of the accessory cable opposite the first plug. They system can include an accessory jack configured to accept the second plug, the accessory jack including at least two wires for providing electrical connections between a model railroad accessory and the accessory cable, when the second plug is plugged into the connection jack. The accessory cable plug can be one of a plug and socket type of electrical connector.

The EID can include a power supply terminal electrically connected to the connection jack such that electrical power can be provided through the power supply terminal to at least one of the two or more wires of the accessory cable, when plugged into the connection jack. The terminal and the connection jack can form a terminal/connection jack pair, where the electronic interface device includes a plurality of terminal/connection jack pairs. The connection jack can be an RJ45 jack and the plug can be an RJ45 connector. The accessory cable can include one or more wires for transmitting control signals from the device for controlling model railroad accessories.

Another aspect features a method for operating model railroad accessories. The method includes electrically connecting two or more wires of an accessory cable to a model railroad accessory, where the accessory cable includes the two or more wires and a plug, wherein the two or more wires are individually insulated wires surrounded by a jacket to form a single assembly and the plug is connected to the two or more wires. Electrically connecting the accessory cable to an electronic interface device by inserting the plug of the accessory cable into a connection jack of the EID. The EID includes a terminal for interfacing with an accessory control device configured to control model railroad accessories, and a power supply terminal, where the connection jack is electrically connected to the power supply terminal and the terminal. Electrically connecting the accessory control device to the terminal, and electrically connecting a power source to the power supply terminal. Causing the accessory control device to control a flow of electrical power to the accessory through the electronic interface device and the accessory cable.

Implementations can include one or more of the following features. For example, the method can include causing the accessory control device to send a control signal to the accessory through the electronic interface device and the accessory cable. The accessory cable can have a pigtail configuration at an end opposite the plug, and electrically connecting the two or more wires of the accessory cable to the model railroad accessory can include connecting the two or more wires from the pigtail configuration to electrical contacts on the accessory.

The accessory cable can have two plugs, one at each end of the accessory cable. Electrically connecting the two or more wires of the accessory cable to the model railroad accessory to can include connecting two or more wires of a connection jack to electrical contacts on the accessory, the connection jack configured to accept one of the plugs of the accessory cable, and inserting one of the plugs of the accessory cable into the connection jack. Electrically connecting the accessory control device to the terminal can include connecting a first wire to a first contact of the accessory control device and to a first contact of the terminal, and connecting a second wire to a second contact of the accessory control device and to a second contact of the terminal.

The details of one or more implementations are set forth in the accompanying drawings and the description, below. Other features will be apparent from the description and drawings, and from the claims.

BRIEF DESCRIPTION OF THE DRAWINGS

FIGS. 2A-2D depicts a block diagram of an example of a system for connecting accessories to a model railroad layout using an example of an electronic interface device.

Like reference symbols in the various drawings indicate like elements.

DETAILED DESCRIPTION

Figure 1:
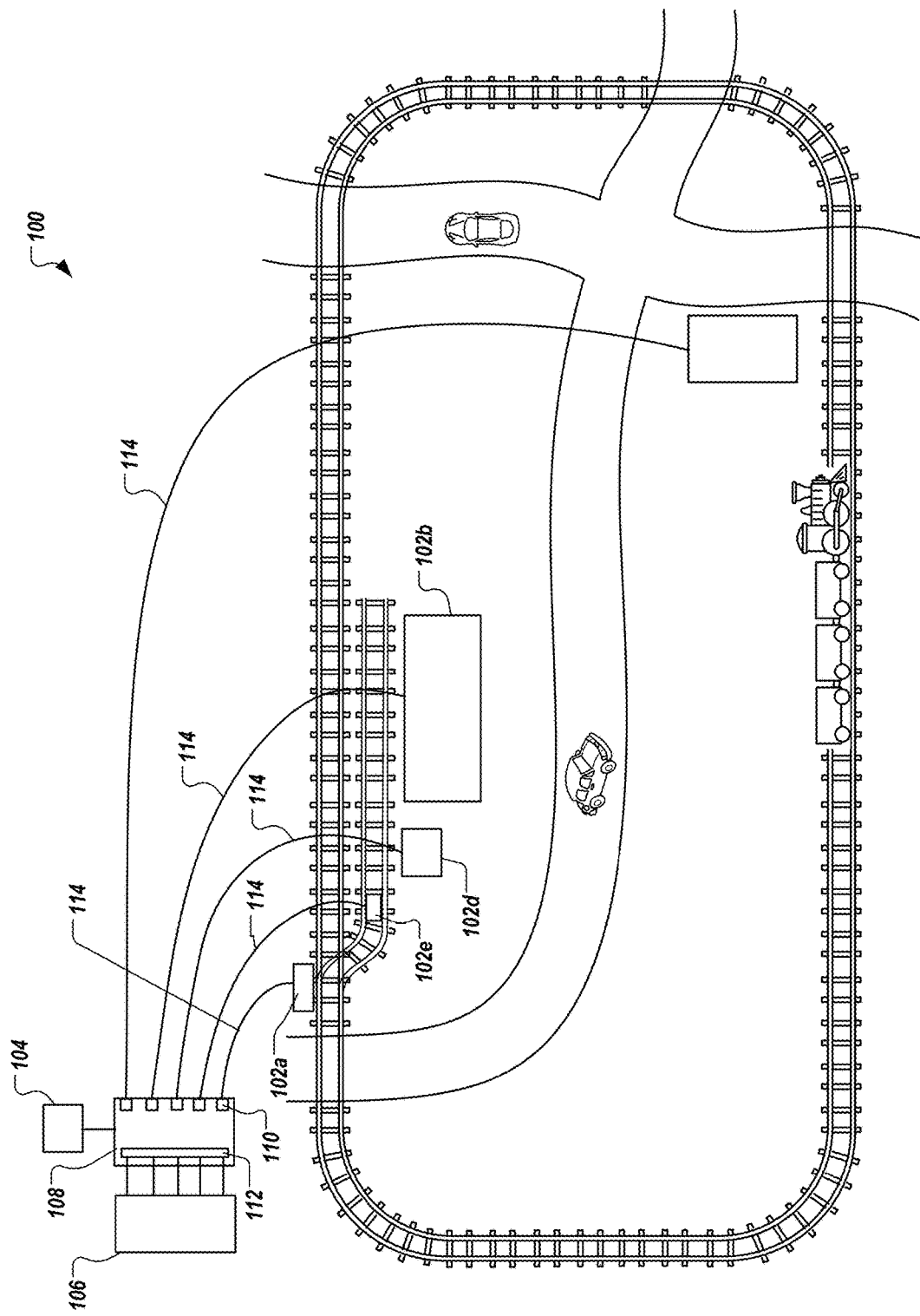
FIG. 1 depicts a diagram of an example of an environment in which an example of an electronic interface device may be employed.

FIG. 1 depicts a diagram of an example of an environment in which an example of an electronic interface device (EID) 108 may be employed. An example of a model railroad layout 100 includes various model railroad accessories 102. The accessories 102 may include various operating accessories such as, for example, switch tracks 102a, buildings (e.g., a train station 102b or a gas station 102c), operating signals 102d, and functional track segments 102e (e.g., an uncoupling track). The accessories 102 require electrical power, and in some examples control signals, for various features of the accessory such as, for example, lighting in or on the accessories, motion (e.g., shifting signals, switching tracks, animation of objects such as a car at a gas station 102c), playing sound effects, or other electrical operations (e.g., activating a magnet of an uncoupling track).

The layout 100 also includes a power source 104, an accessory control device (ACD) 106, and an EID 108. The power source 104 provides electrical power for operating the accessories 102, and can be, for example, a transformer. The ACD 106 controls the operation of the accessories 102, and can be an accessory controller such as, for example, an MTH Accessory Interface Unit or a Lionel Accessory Switch Controller, or other devices that can control the operation of a model railroad accessory. For example, the ACD 106 can control accessory function by controlling the power supplied to one or more accessories 102 (e.g., providing or removing power to the accessory to turn a light on or off), or by providing a control signal to the accessory to activate a function of the accessory (e.g., to operate a switch track, activate a sound effect, or trigger an animation). The ACD 106 includes multiple electrical contacts for controlling multiple accessories 102. In some examples, it interfaces with a wireless remote for receiving control signals from a user. Although illustrated separately, in some examples, the power source 104 and the ACD 106 may be one device.

The EID 108 provides a common interface for connecting one or more accessories 102 to the power source 104 and the ACD 106. Referring to both FIGS. 1 and 2A, the EID 108 includes connection jacks or ports 110 and an interface terminal 112. The connection jacks 110 are electromechanical constructs designed to receive a plug and couple a set of wires in the plug to a corresponding set of wires in the jack. Each of the connection jacks 110 are electrically connected to corresponding inputs on the interface terminal 112, and are configured to accept a plug on an accessory cable 114. The interface terminal 112 includes a set of electrical connections to interface with accessory control connections on the ACD 106. Each connection jack 110 is paired with corresponding electrical connections on the interface terminal 112, forming a connection jack/interface terminal pair. The EID 108 can include any appropriate number of connection jack/interface terminal pairs (e.g., 1, 2, 3, 5, 10, 15, etc.) In some implementations, the interface terminal 112 is a single unit, such as a single terminal block, containing a plurality of sets of electrical connections corresponding to respective connection jacks 110, for example, as shown in FIG. 1. In some implementations, the interface terminal 112 includes a set of separate units, for example, separate terminal blocks, each containing a set of electrical connections corresponding to a respective connection jack 110, for example, as shown in FIG. 2A.

The EID 108 also includes a power terminal 202 (shown in FIG. 2A) for connecting the power source 104 to the EID 108. The EID 108 distributes electrical power from the power terminal 202 to the connection jacks 110 and to appropriate electrical connections on the interface terminal 112. Depending on the type of accessory and associated controls, wires 203 can be connected between appropriate electrical connections on the ACD 106 and corresponding electrical connections on the EID's 108 interface terminal 112 to provide electrical power, and as applicable, control signals to the accessory 102 through an accessory cable 114 connected to a corresponding connection jack 110. In some implementations, the EID 108 and the ACD 106 can be combined into a single unit 120.

The accessory cable 114 includes multiple separately insulated wires enclosed in a jacket to form a single assembly and a plug on at least one end of the cable 114 and connected to the multiple wires. FIG. 2B, which is a detailed view of region B, shows an example plug 204 on one end of the cable 114. The plug 114 can be any appropriate type of electrical cable plug such as, for example, a plug and socket type of connection. The plug 204 can be either the male or female connector with the connection jack 110 being the corresponding connection type. Together, the connection jack 110 and plug 204 provide a singular connection interface for making multiple accessory wire connections (e.g., the wires within the cable 114) for a model railroad accessory.

In some examples, and as described in more detail below with respect to FIG. 4A, appropriate electrical connections on the interface terminal 112 of the EID 108 can be used to route electrical power for an accessory 102 through the ACD 106 such that the ACD 106 serves as a remote switch for the accessory. Thus, the accessory functions such as turning lights on and off can be controlled from the ACD 106, while using the EID 108 to provide a single connection interface for the wire connections between the accessory and the ACD 106.

Region B of FIG. 2A shows an example of a connection between an accessory cable 114 and a model railroad accessory 102. FIGS. 2C and 2D illustrate in more detail two examples of the connection shown in region B. Referring first to FIG. 2C, one end of the accessory cable 114 can include a pigtail configuration, where the individual wires 210a-210c extend out of the jacket 212. In this example, accessory cable 114 can be connected to the accessory 102 by connecting the wires 210a-210b to appropriate electrical contacts 208 on the accessory 102. An implementation as shown in FIG. 2C may be use to adapt traditional accessory connections for use with the single connection interface provided by the EID 108.

Referring to FIG. 2D, the accessory cable 114 can include a second plug 204 for connecting to a corresponding connection jack 206 on the accessory 102. For example, an accessory can include an accessory cable connection jack 206 pre-wired to the accessory 102 (that is, wired to the accessory during manufacture of the accessory 102, as opposed to being retrofitted after sale to the end-consumer). The connection jack 206 can be of the same type (e.g., male or female) as the connection jacks 110 of the EID 108, or of an opposite type. In some examples, the accessory jack 206 can be sold separately from the accessory (e.g., to provide backwards compatibility with older accessories). In such examples, the connection jack 206 can include a number of wires 210a-210c for connecting the jack 206 to appropriate electrical contacts 208 on the accessory 102. In addition, the connection jack 206 can include mechanical fasteners to attach the jack 206 to the accessory 102 such as, for example a double sided adhesive, hook and loop fasteners, or threaded fasteners (e.g., screws).

In some implementations, the EID 108 connection jacks 110 and corresponding plugs 204 can be configured to make a watertight seal, for example, the plug 204, the jacks 110, or both can include a gasket that forms a watertight seal when the a plug 204 is inserted into a jack 110. Similarly, in some implementations, an accessory connection jack 206 and corresponding plug 204 can be configured to make a watertight seal, for example, the plug 204, the jack 206, or both can include a gasket that forms a watertight seal when the a plug 204 is inserted into a jack 206. In addition, the accessory jack 206 can include a gasket on one surface to form a watertight seal with the accessory 102, when the jack 206 is attached to the accessory. Such implementations may, for example, permit use of the EID 108 with outdoor layouts, for example, garden layouts.

Figure 3:
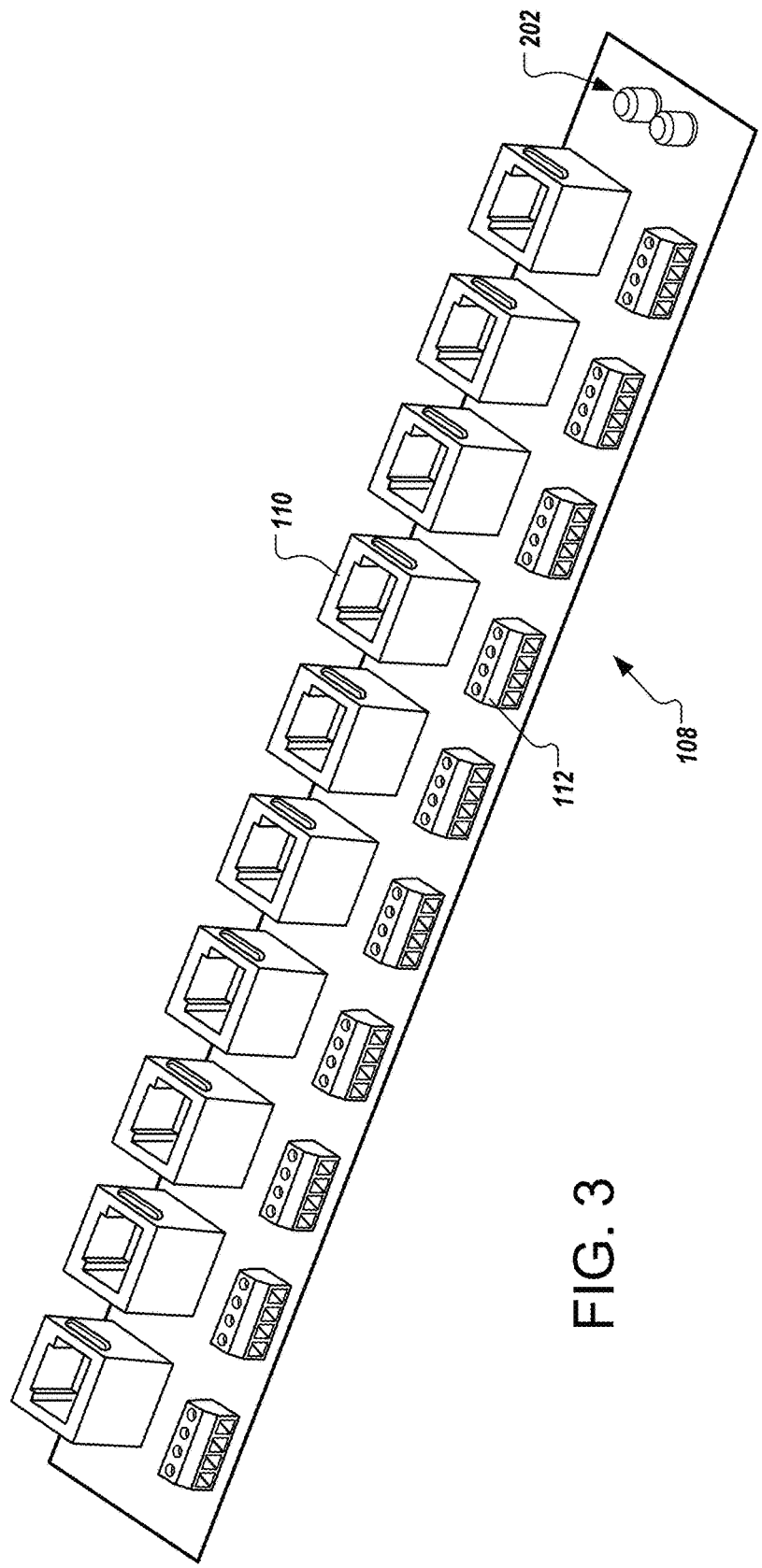
FIG. 3 depicts a perspective view of an example of an electronic interface device.

FIG. 3 shows a perspective view of an example of an EID 108. As depicted in FIG. 3, the connection jacks are female RJ45 type connections. Such a configuration may allow a user to adapt readily available CAT6 cables for use as accessory cables. In addition, the power supply terminal 202 is shown as a pair of binder posts; one binder post for each of the positive and negative polarity connections of a power source 104. In some implementations, the power supply terminal 202 can include a neutral or ground contact. In some implementations, the power supply terminal 202 can be a plug and socket type of electrical connection. In some examples, the power supply terminal 202 can be hardwired to a power source such as, for example, standard wall plug, a transformer, or a transformer/rectifier (e.g., for a DC power supply).

Figure 4A:
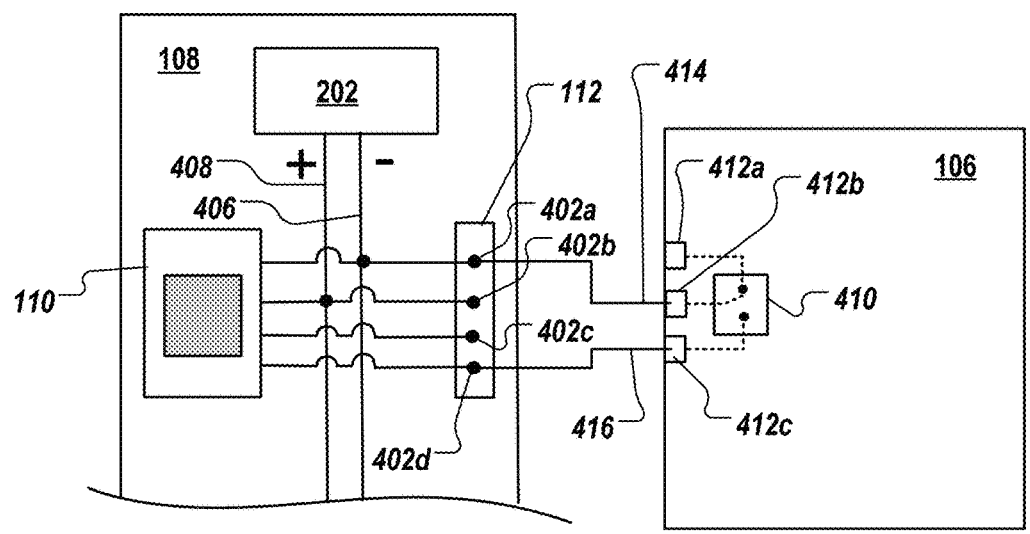
FIGS. 4A and 4B depict examples of wiring diagrams for portions of an example of an electronic interface device.
Figure 4B:
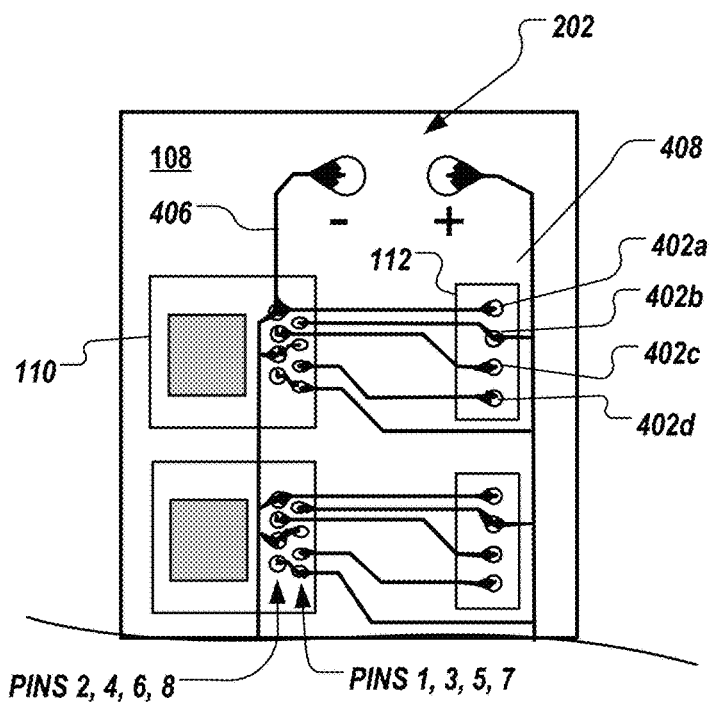

FIGS. 4A and 4B depict example wiring diagrams for portions of an example of an EID, such as EID 108. FIG. 4A shows an example of a wiring diagram for one connection jack/interface terminal pair of an implementation of the EID 108. In the example shown, the connection jack 110 is electrically connected to four electrical contacts 402a-402d on an interface terminal 112. The electrical connections 404 between the connection jack 110 and the electrical contacts 402a-402d can be wires or wire traces on a printed circuit board, for example. Each of the four electrical contacts 402 is electrically connected to a corresponding contact in the connection jack 110 which connects to one of the wires in an accessory cable 114, for example, by way of the corresponding accessory cable plug 204. The EID 108 also includes two power buses (a negative or ground bus 406 and a positive bus 408) connected to the power supply terminal 202. One of the electrical contacts 402a is electrically connected to the negative bus 406 and another electrical contact 402b is electrically connected to the positive bus 408. In addition, the negative bus 406 and the positive bus 408 are each electrically connected to one of the contacts in the connection jack 110.

FIG. 4A also shows an example of a connection between the interface terminal 112 and an ACD 106 for controlling an accessory. The example shown illustrates a possible connection for turning power to an accessory on and off. For example, the ACD 106 may allow a user to remotely control a relay 410 (or other electronic switch) within the ACD 106. In addition, the ACD 106 may include several electrical contacts 412a-412c to connect an accessory to the ACD 106. In the example shown, a first wire 414 is connected from contact 402a (the negatively biased or grounded contact) of the interface terminal 112 to one of the electrical contacts 412a-412c of the ACD 106, for example, contact 412b to an armature of the relay 410 or a common terminal). A second wire 416 is connected from contact 402d of the interface terminal 112 to another one of the contacts 412a-412c of the ACD 106, for example, contact 412c to a normally open or contact 412a to a normally closed terminal of the relay 410. In the described example a wire of an accessory cable that is connected to contact 402d of the interface terminal can be connected to one of the accessory's electrical contacts (e.g., a negative or ground contact) and a wire of the accessory cable that is connected to the positive bus 408 can be connected to another one of the accessory's electrical contacts (e.g., a positive contact). Power to the accessory can then be controlled by operation of the ACD 106 and the accessory can readily be connected or disconnected from a layout by installing or removing it's accessory cable plug from the connection jack 110 of the EID 108.

FIG. 4B shows an example of a wiring diagram for two connection jack/interface terminal pairs of another implementation of the EID 108. The example shown is similar in concept to that of FIG. 4A, but illustrates an example of a wiring configuration for an EID 108 that uses an RJ45 connection jack 450. The connection jack 450 includes wiring connections 1-8 that correspond to the eight wires of a CAT6 cable. Pins 1, 2, and 7 are connected to the positive buss 408, pins 4, 5, and 8 are connected to the negative (ground) bus 406, and pins 3 and 6 are connected to contacts 402d and 402c respectively. The connection of three of the CAT6 cable wires to each of the power buses may, for example, permit a greater current load through the cable.

Figure 5:
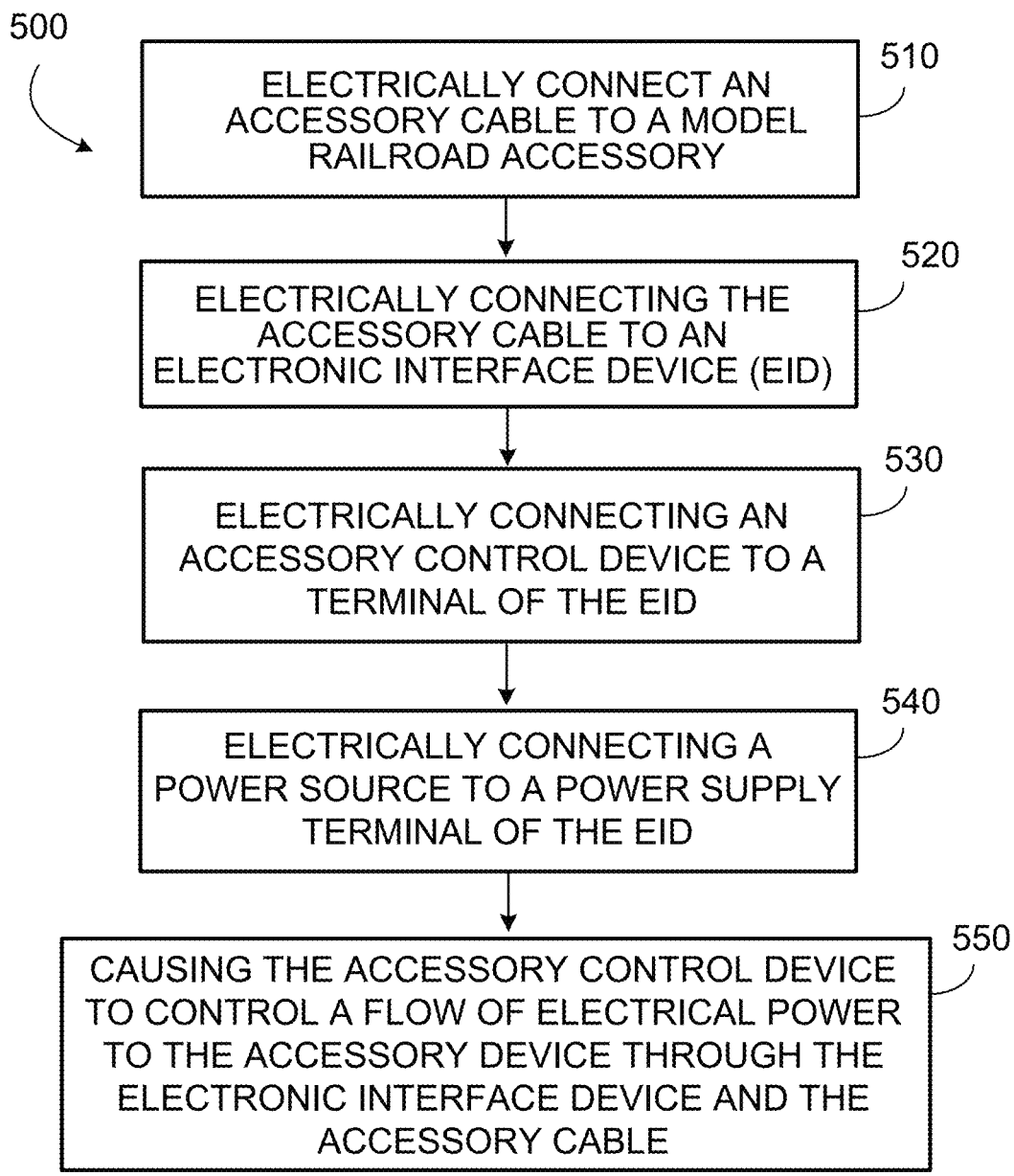
FIG. 5 depicts a flowchart of an example of a process for controlling model railroad accessories.

FIG. 5 depicts a flowchart of an example of a process 500 for controlling model railroad accessories. Briefly, the process 500 includes: connecting an accessory cable to a model railroad accessory (510), connecting the accessory cable to an EID (520), connecting an ACD to an interface terminal of the EID (530), connecting a power source to a power supply terminal of the EID (540), and causing the accessory control device to control a flow of electrical power to the accessory through the EID and the accessory control cable (550).

In more detail the process 500 includes electrically connecting two or more wires of an accessory cable to a model railroad accessory, where the accessory cable has a plug on at least one end (510). For example, the accessory cable can have a pigtail configuration at one end and a plug at the other. Two or more wires at the pigtail end of the accessory cable can be connected to electrical contacts on the accessory. In some implementations, the accessory cable can have a plug at each end. A connection jack configured to accept one of the plugs on the accessory cable can be connected to the accessory. The connection jack can have having two or more wires corresponding to the wires in the accessory cable which can be connected to electrical contacts on the accessory. One of the plugs on the accessory cable can be inserted into the connection jack to electrically connect the accessory cable to the model railroad accessory.

The accessory cable is electrically connected to an EID by inserting the plug of the accessory cable into a connection jack of the electronic interface device (520). The electronic interface device includes a terminal for interfacing with an ACD, and a power supply terminal. And, the connection jack of the EID is electrically connected to the power supply terminal and the terminal. An accessory control device is electrically connected to the interface terminal (530). For example, a first wire can be connected between a first contact of the ACD and a first contact of the interface terminal, and a second wire can be connected between a second contact of the accessory control device and a second contact of the interface terminal. A power source is electrically connected to the power supply terminal (540).

The ACD is caused to control a flow of electrical power to the model railroad accessory through the EID and the accessory cable (550). For example, a control of the ACD can cause the ACD to conduct or interrupt a flow of power from the power supply to the accessory. In some examples, the accessory control device can be caused to send a control signal to the accessory through the electronic interface device and the accessory cable. For example, the ACD can send an electrical pulse (e.g., a brief duration power signal) to the accessory to trigger a function of the accessory (e.g., switching a switch track, activating a sound or motion of the accessory).

Certain implementations described above may provide various advantages. For example, some implementations may allow a model train user to conveniently connect and disconnect operating accessories to a central control unit on a model train layout. Additionally, for example, some implementations may provide backwards compatibility with older accessories that do not have a connection jack for an accessory cable. In addition, for example, some implementations may make adding operating accessories to a model train layout less confusing and time consuming.

While a number of examples have been described for illustration purposes, the foregoing description is not intended to limit the scope of the invention, which is defined by the scope of the appended claims. There are and will be other examples and modifications within the scope of the following claims.

The invention claimed is:

1. A system for connecting powered accessories to a model railroad layout, the system comprising:
 a model railroad accessory control device comprising:
  a plurality of electrical contacts, and
  an electronic switch coupled between a first and a second one of the plurality of electrical contacts;
 an accessory cable comprising two or more individually insulated wires surrounded by a jacket to form a single assembly and a plug connected to the two or more wires; and
 an electronic interface device comprising:
  a terminal configured to interface with the first and the second one of the plurality of electrical contacts of the model railroad accessory control device,
  a connection jack configured to accept the plug of the accessory cable and place at least one of the two or more wires of the accessory cable in electrical contact with the terminal such that, when the first and the second one of the plurality of electrical contacts of the model railroad accessory control device are electrically connected to the terminal, the at least one of the two or more wires of the accessory cable are placed in electrical communication with the model railroad accessory control device, when the plug of the accessory cable is plugged into the connection jack, and
  electrical connections between the terminal and the connection jack, the electrical connections arranged between pins of the terminal and pins of the connection jack to permit the model railroad accessory control device to control a flow of power supplied through the connection jack and accessory cable to a model railroad accessory by operation of the electronic switch of the model railroad accessory control device.

2. The system of claim 1, wherein the plug is a first plug, and the accessory cable comprises a second plug connected to the two or more wires at an end of the accessory cable opposite the first plug, and wherein the system further comprises:
 an accessory jack configured to accept the second plug, the accessory jack comprising at least two wires for providing electrical connections between a model railroad accessory and the accessory cable, when the second plug is plugged into the connection jack.

3. The system of claim 1, wherein the accessory cable plug is one of a plug and socket type of electrical connector.

4. The system of claim 1, wherein the electronic interface device further comprises a power supply terminal electrically connected to the connection jack such that electrical power can be provided through the power supply terminal to at least one of the two or more wires of the accessory cable, when plugged into the connection jack.

5. The system of claim 1, wherein the terminal and the connection jack form a terminal/connection jack pair, and wherein the electronic interface device further comprises a plurality of terminal/connection jack pairs.

6. The system of claim 1, wherein the connection jack comprises an RJ45 jack and the plug is an RJ45 connector.

7. The system of claim 1, wherein the accessory cable further comprises one or more wires for transmitting control signals from the device for controlling model railroad accessories.

8. The system of claim 1, wherein the accessory cable has a pigtail configuration at an end opposite the plug.

9. The system of claim 1, wherein the plug is a first plug, and the accessory cable comprises a second plug connected to the two or more wires at an end of the accessory cable opposite the first plug, and
 wherein the system further comprises a model railroad accessory comprising an accessory jack configured to accept the second plug, the accessory jack comprising at least two wires for providing electrical connections between the model railroad accessory and the accessory cable, when the second plug is plugged into the accessory jack.

10. A system comprising;
a model railroad accessory control device comprising:
   a plurality of electrical contacts, and
   an electronic switch coupled between a first and a second one of the plurality of electrical contacts;
an accessory cable comprising two or more individually insulated wires surrounded by a jacket to form a single assembly, a first plug connected to the two or more wires, and a second plug connected to the two or more wires at an end of the accessory cable opposite the first plug;
a model railroad accessory comprising an accessory jack configured to accept the second plug, the accessory jack comprising at least two wires for providing electrical connections between the model railroad accessory and the accessory cable, when the second plug is plugged into the accessory jack; and
an electronic interface device comprising:
   a terminal configured to receive electrical connections with the first and the second one of the plurality of electrical contacts of the model railroad accessory control device that is configured to control features of model railroad accessories,
   a connection jack configured to accept the first plug of the accessory cable and place at least one of the two or more wires of the accessory cable in electrical contact with the terminal such that the model railroad accessory is placed in electrical communication with the model railroad accessory control device, when the first plug of the accessory cable is plugged into the connection jack, when the second plug of the accessory cable is plugged into the accessory jack, and when the first and the second one of the plurality of electrical contacts of the model railroad accessory control device are electrically connected to the terminal, and
   electrical connections between the terminal and the connection jack, the electrical connections arranged between pins of the terminal and pins of the connection jack to permit the model railroad accessory control device to control a flow of power supplied through the connection jack and accessory cable to the model railroad accessory by operation of the electronic switch of the model railroad accessory control device.

* * * * *